US010761734B2

(12) United States Patent
Eads

(10) Patent No.: US 10,761,734 B2
(45) Date of Patent: Sep. 1, 2020

(54) SYSTEMS AND METHODS FOR DATA FRAME REPRESENTATION

(71) Applicant: General Electric Company, Schenectady, NY (US)

(72) Inventor: Damian Ryan Eads, San Francisco, CA (US)

(73) Assignee: General Electric Company, Schenectady, NY (US)

( * ) Notice: Subject to any disclaimer, the term of this patent is extended or adjusted under 35 U.S.C. 154(b) by 439 days.

(21) Appl. No.: 15/691,630

(22) Filed: Aug. 30, 2017

(65) Prior Publication Data

US 2019/0065053 A1    Feb. 28, 2019

(51) Int. Cl.
| | |
|---|---|
| *G06F 16/00* | (2019.01) |
| *G06F 3/06* | (2006.01) |
| *G06N 20/00* | (2019.01) |
| *G06F 16/27* | (2019.01) |
| *G06F 16/22* | (2019.01) |
| *G06F 16/28* | (2019.01) |
| *G06F 9/54* | (2006.01) |

(52) U.S. Cl.
CPC .............. *G06F 3/061* (2013.01); *G06F 3/065* (2013.01); *G06F 3/067* (2013.01); *G06F 3/0619* (2013.01); *G06F 16/221* (2019.01); *G06F 16/27* (2019.01); *G06F 16/289* (2019.01); *G06N 20/00* (2019.01); *G06F 3/0631* (2013.01); *G06F 9/54* (2013.01)

(58) Field of Classification Search
CPC ...... G06F 3/061; G06F 3/0631; G06F 3/0619; G06F 16/221; G06F 16/27; G06F 16/289; G06N 20/00
See application file for complete search history.

(56) References Cited

U.S. PATENT DOCUMENTS

| | | | | | |
|---|---|---|---|---|---|
| 6,016,511 | A | * | 1/2000 | Cook | ...................... H04L 49/90 709/230 |
| 8,819,676 | B2 | * | 8/2014 | Ports | ................... G06F 9/45558 718/1 |
| 8,918,363 | B2 | * | 12/2014 | Naidu | ..................... G06F 8/453 707/610 |
| 9,740,626 | B2 | * | 8/2017 | Sharanhovich | ..... G06F 12/1036 |
| 10,031,672 | B2 | * | 7/2018 | Wang | ...................... G06F 3/065 |
| 10,484,473 | B2 | * | 11/2019 | Moorthi | ............. H04L 67/1097 |
| 2004/0252902 | A1 | * | 12/2004 | Vienneau | ................ G06T 11/60 382/240 |

(Continued)

OTHER PUBLICATIONS

Haase, FramerD: Representing knowledge in the large, IEEE (Year: 1996).*

*Primary Examiner* — Jean M Corrielus

(74) *Attorney, Agent, or Firm* — Buckley, Maschoff & Talwalkar LLC

(57) ABSTRACT

Various embodiments provide a copy-on-write data frame (CoW-DF) that permits lightweight copies of a data frame, where the copies comprise memory allocation for only changed portions of a data frame. A CoW-DF may have semantics of a data frame, and a CoW-DF may appear and behave like a traditional data frame copy, while on the backend of a CoW-DF, only data differences created by modifications to a data frame may be maintained, rather than whole copies of a modified data frame. For various embodiments, the CoW concept is applied to other types of data structures, such as a column, a row, or a data frame value.

13 Claims, 9 Drawing Sheets

(56) References Cited

U.S. PATENT DOCUMENTS

| | | | |
|---|---|---|---|
| 2005/0033878 A1* | 2/2005 | Pangal | G06F 3/0647 |
| | | | 710/36 |
| 2009/0032394 A1* | 2/2009 | Wu | C08J 5/20 |
| | | | 204/400 |
| 2013/0124466 A1* | 5/2013 | Naidu | G06F 16/27 |
| | | | 707/610 |
| 2016/0232197 A1* | 8/2016 | Vaquero Gonzalez | |
| | | | G06F 3/0619 |
| 2017/0046270 A1* | 2/2017 | Sharanhovich | G06F 12/1036 |
| 2017/0344488 A1* | 11/2017 | Sharanhovich | G06F 12/1036 |
| 2018/0046401 A1* | 2/2018 | Marathe | G06F 3/0631 |
| 2018/0196860 A1* | 7/2018 | Barber | G06F 16/258 |

* cited by examiner

SYSTEMS AND METHODS FOR DATA FRAME REPRESENTATION

TECHNICAL FIELD

The present application relates to data structures and, more particularly, representations of data frames, which may be used in connection with machine learning.

BACKGROUND

A data frame object is typically a rectangular, columnar data structure used for data-driven applications, machine learning, and other workloads. Data frames are often immutable, which provides several benefits. As a first benefit, data can be shared in parallel among multiple workers without the need for locking, write consistency, or other mechanisms. As a second benefit, an application program interface (API) can control against side effects so API callers have no unexpected modifications to data frames passed to a function or sub-procedure.

The downside of immutable data frames is modifications and transformations can result in significant copying. For instance, a data scientist doing data exploratory work may modify data sets using data frames. Using today's data frame technology, the data scientist would need to either (a) copy an entire data frame to modify and then rerunning analysis on the modified data frame, or (b) use a mutable data frame that does not have the benefits of an immutable data frame. This can make such data exploratory work either memory-intensive or prone to computational errors.

BRIEF DESCRIPTION OF THE DRAWINGS

Some embodiments are illustrated by way of example and not limitation in the figures of the accompanying drawings.

DETAILED DESCRIPTION

Figure 1:
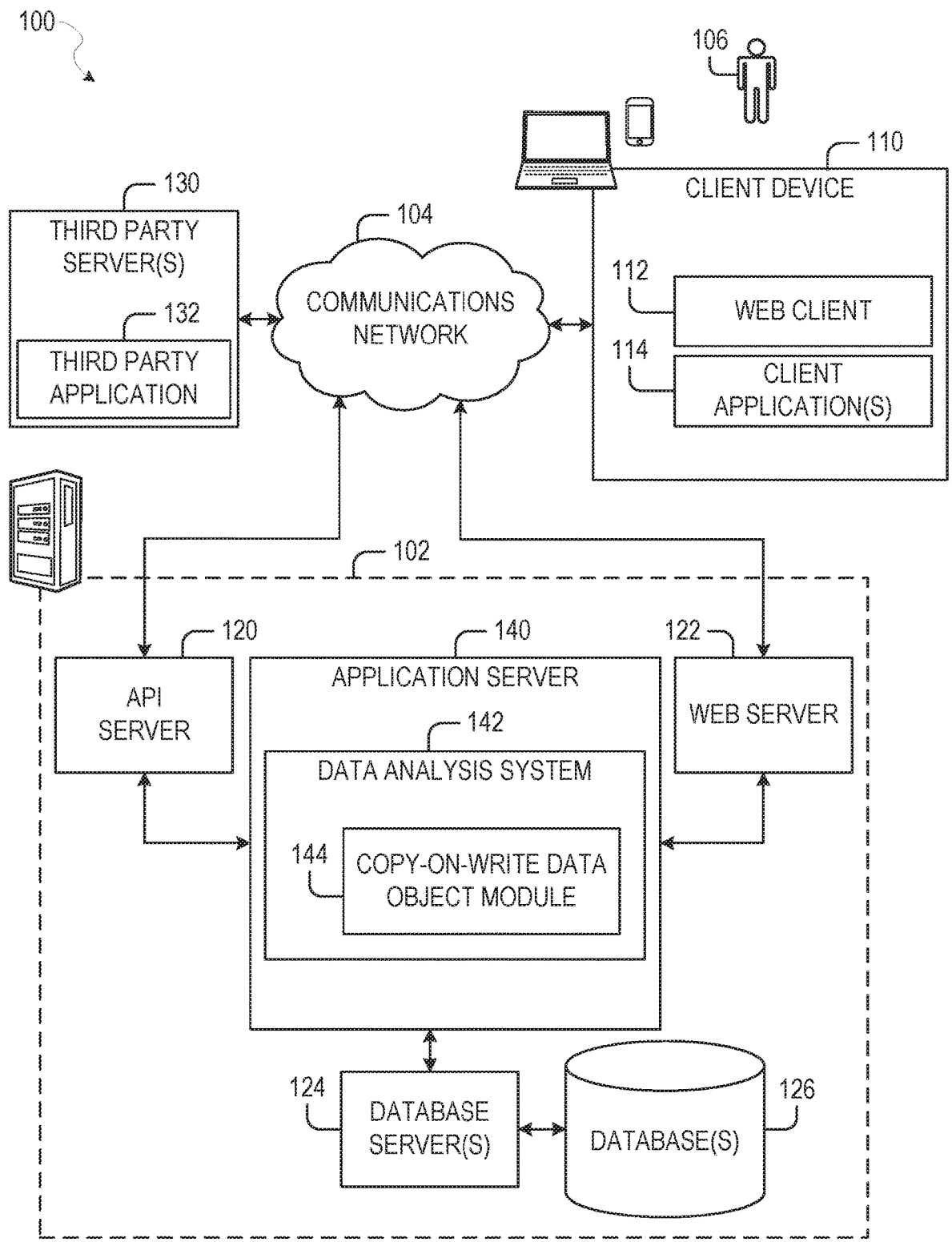
FIG. 1 is a block diagram illustrating an example networked system including a copy-on-write (CoW) data object module, according to some embodiments.

Various embodiments described herein provide a copy-on-write data frame (CoW-DF) that permits lightweight copies of a data frame, where the copies comprise memory allocation for only changed portions of a data frame. In particular, a CoW-DF permits the creation of a latent copy of a data frame. A CoW-DF may have semantics of a data frame, and a CoW-DF may appear and behave like a traditional data frame copy (e.g., like it is immutable), while on the backend of a CoW-DF, only data differences created by modifications to a data frame may be maintained, rather than whole copies of a modified data frame. The CoW-DF may substantially reduce the computational resources necessary to process changes to a data frame. Take, for example, a hypothetical data frame that comprises one million columns. Under the prior art, a data scientist would have to make a complete copy of a modified version of the entire data frame even if only a small portion were edited. Using the novel CoW-DF disclosed herein would substantially reduce the computational load of processing modifications as only the modified columns would be retained in memory rather than the entire frame. A CoW-DF described herein may be useful when running data processing steps (e.g., data transformations), particularly with respect to in the context of machine learning ("ML") applications where many minor modifications to a data set made be made in order to facilitate the learning of an ML model.

Two exemplary implementations of the CoW-DF data objects are disclosed herein, though the disclosed invention encompasses the broadest possible range of CoW-DF implementations. In one implementation, a latent copy Y of a data frame X may be executed, but actual copying from the original data frame X only happens when someone changes a column of the latent data frame Y, and the copy only includes the entire column that has undergone the change. Even in instances where an individual column may take up substantial memory, this implementation can result in substantially less memory usage and superior performance.

In an alternative implementation, a column of a data frame X is divided into blocks. After a latent copy Y of a data frame X is executed and a change occurs to the latent copy data frame Y, only the block of the column that is actually changed is copied.

According to some embodiments, one or more of the following data operations produce a canonical-shallow copy:

a. row subsetting of a CoW-DF or CoW column data object;

b. row slicing of a CoW-DF or CoW column data object;

c. row accession of a CoW-DF;

d. value accession of a CoW column, CoW-DF, or Row data object;

e. column subsetting of a CoW-DF data object;

f. column slicing of a CoW-DF data object;

g. column accession of CoW-DF data object; and h. any combination of a-c and e-g.

As used herein, a Row data object may comprise a data structure (e.g., struct) with a pointer to a data frame and an integer representing the row referred. More regarding these and other data operations are described later herein.

Various embodiments disclosed herein reduce the memory requirements of a worker in a cluster computing environment by orders of magnitude. The CoW-DFs are relatively lean data structures that can reduce computational costs and enable significantly more work to be performed on the same cluster. Additionally, various embodiments obviate the need to maintain a lot of copies of data frames in production environment (e.g., data analytics) where modifying data frames is a common occurrence. With respect to machine learning-based software platforms, a CoW-DF of an embodiment may be used to represent ephemeral machine-learning data sets that can be used for training or prediction. For instance, with respect to a machine-learning, data analysis platform, such as Predix® from GE Digital, a CoW-DF can be used to represent machine-learning data sets containing industrial machine data, which can include event logs, time series data, images, and sensor data.

For various embodiments, the CoW concept described herein can be applied or extended to different types of data structures other than just data frames, such data frame values, rows, and columns. Additionally, a particular type of CoW data structure may be implemented, and thereafter represented, by a data object of the particular type (e.g., data object class). For instance, a CoW DF can be implemented by a CoW data frame data object, a CoW data frame value can be implemented by a CoW data frame value data object, a CoW column can be implemented by a CoW column data object, and a CoW row can be implemented by a CoW row data object.

The description that follows includes systems, methods, techniques, instruction sequences, and devices that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram illustrating an example networked system 102 including a copy-on-write (CoW) data object module 144, according to some embodiments. For some embodiments, the CoW data object module 144 provides support for a CoW data object described herein, such as a CoW-DF data object, a CoW column data object, a CoW row data object, or a CoW data frame value data object. For instances, the CoW data object module 144 may facilitate generation, copying, access, and modification of a CoW data object. In this way, the CoW data object module 144 can implement a CoW data object framework for use in development or operation of a software application, such as one relating to management or operation of industrial devices (e.g., Industrial IoT (IIoT) devices).

With reference to FIG. 1, an embodiment of a high-level client-server-based network architecture 100 is shown. As shown, the network architecture 100 includes the network system 102, a client device 110, one or more third party servers 130, and a communication network facilitating data communication there between. The network system 102 provides server-side data analysis functionality via the communications network 104 to one or more client devices 110. FIG. 1 illustrates, for example, a web client 112, such as a web browser, and a client application 114 executing on the client device 110.

As also shown, the network system 102 includes a data analysis system 142 comprising the CoW data object module 144. The data analysis system 142 may use one or more machine learning (ML) algorithms or models in performing data analysis operations, which may relate to analyzing data from industrial devices, such as generators, wind turbines, medical devices, jet engines, and locomotives. In this way, the networked system 102 can form an industrial device data analysis software platform. The industrial device data analysis software platform can include a collection of software services and software development tools, which enable a user (e.g., an industrial customer) to use, or develop and use, applications for optimizing industrial business processes with respect to industrial devices.

The CoW data object module 144 can support CoW data objects that may be used in the operation of data analysis operations performed by the data analysis system 142. For instance, the CoW data object module 144 can support CoW-DF data objects used in storing and modifying sensor data from an industrial device, such as a generator or a wind turbine. Such CoW-DF data objects may be used to store input data, training data, or prediction data with respect to a ML model involved in the operation of an industrial application that predicts maintenance issues.

The client device 110 may comprise, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may utilize to access the networked system 102. In some embodiments, the client device 110 comprises a display module (not shown) to display information, such as in the form of user interfaces. In further embodiments, the client device 110 comprises one or more touch screens, accelerometers, gyroscopes, cameras, microphones, global positioning system (GPS) devices, and so forth. The client device 110 may be a device of a user that is used to access data analysis or industrial applications supported by the networked system 102. One or more users 106 may be a person, a machine, or other means of interacting with the client device 110. In embodiments, the user 106 is not part of the network architecture 100, but interacts with the network architecture 100 via the client device 110 or another means. For example, one or more portions of the communications network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a Wi-Fi® network, a WiMax network, another type of network, or a combination of two or more such networks.

The client device 110 may include one or more applications such as, but not limited to, a business or industrial applications supported by the data analysis system 142. In some embodiments, the business or industrial application is included in one of the client devices 110, and the application is configured to locally provide the user interface and at least some of the functionalities to communicate with the networked system 102, on an as-needed basis, for data or processing capabilities not locally available. Conversely, in some embodiments, the business or industrial application is not included in the client device 110, and the client device 110 may use its web browser to access the business or industrial application (or a variant thereof) hosted on the networked system 102.

One or more users 106 may be a person, a machine, or other means of interacting with the client device 110. In embodiments, the user 106 is not part of the network architecture 100, but may interact with the network architecture 100 via the client device 110 or other means. For instance, the user 106 provides input to the client device 110 and the input is communicated to the networked system 102 via the communications network 104. In this instance, the networked system 102, in response to receiving the input from the user 106, communicates information to the client device 110 via the communications network 104 to be presented to the user 106. In this way, the user 106 can interact with the networked system 102 using the client device 110.

An application programming interface (API) server 120 and a web server 122 are coupled to, and provide programmatic and web interfaces respectively to, one or more application servers 140. As shown, the application server 140 hosts the data analysis system 142, which in addition to the CoW data object module 144, may include one or more additional modules, each of which may be embodied as hardware, software, firmware, or some combination thereof.

The application server 140 is shown to be coupled to one or more database servers 124 that facilitate access to one or more information storage repositories or databases 126. In an embodiment, the databases 126 are storage devices that store information, such a data generated and collected from an industrial device to be analyzed by the data analysis system 142.

Additionally, a third-party application 132, executing on third party servers 130, is shown as having access to the networked system 102 via the programmatic interface provided by the API server 120. For example, the third-party application 132, may collect data with respect to an industrial device, such as diagnostic data, performance data, or sensor data, and provide it to the networked system 102 for storage and subsequent data analysis via the data analysis system 142.

Figure 2:
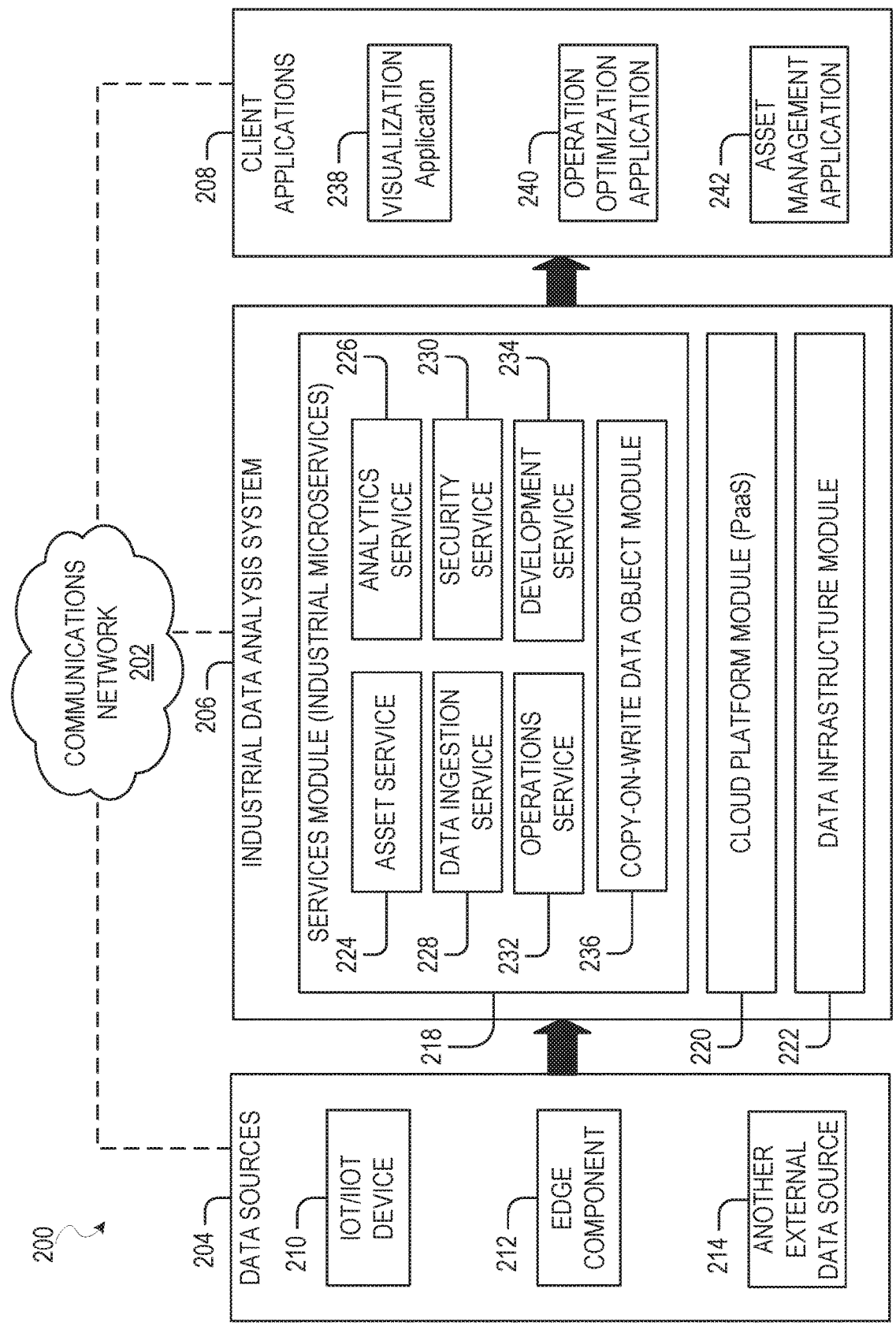
FIG. 2 is a block diagram illustrating an example system including a copy-on-write (CoW) data object module, according to some embodiments.

FIG. 2 is a block diagram illustrating an example system 200 including a copy-on-write (CoW) data object module 236, according to some embodiments. As shown, the system 200 includes one or more data sources 204, an industrial data analysis system 206, one or more client applications 208, and a communications network 202 to facilitate data communication therebetween. The data sources 204 can represent any source that can provide data to the industrial data analysis system 206 to perform analysis and other operations. As shown, the data sources 204 include an IoT or IIoT device 210, an edge component 212, such as a IoT/IIoT gateway, device controller or sensor node, or another external data source 214, such as a database that collects and stores IIoT device event logs, error logs, time series data, and the like.

For some embodiments, the industrial data analysis system 206 represents a machine-learning, data analysis platform, such as Predix®, which may use a CoW data object to represent machine-learning data sets containing industrial machine data, such as event logs, time series data, images, and sensor data. The client applications 208 may represent those applications that use functions of, or data results generated by, the industrial data analysis system 206. As shown, the client applications 208 include a visualization application 238, an operation optimization application 240, and an asset management application 242, such as an industrial device software application.

The industrial data analysis system 206 includes a services module 218, a cloud platform module 220, and a data infrastructure module 222. The industrial data analysis system 206 can include a collection of software services and software development tools, which enable a user (e.g., an industrial customer) to use, or develop and use, applications for optimizing industrial business processes with respect to industrial devices. For instance, the industrial data analysis system 206 can IIoT devices, digest data from such devices, analyze the digested data using services (e.g., microservices) provided by the services module 218, and make predictions using machine-learning (ML) implemented by one or more services of the services module 218. A CoW data object described herein, such as a CoW-DF data object, may be used to store data from an IIoT device and, subsequently, used in by an operation of one or more services of the service module 218.

The services modules 218 can provide various industrial services that a development user can use to build an industrial software application, or pre-built software services (e.g., from third party vendor). As shown, the services module 218 includes an asset service 224, an analytics service 226, a data ingestion service 228, a security service 230, an operations service 232, a development service 234, and a copy-on-write (CoW) data object module 236. The asset service 224 may facilitate creation, importation, and organization of industrial device/asset models and associated business rules. The analytics service 226 may facilitate creation, catalog, or orchestration of analytics on industrial devices, which can server as basis for industrial applications, such as the client applications 208. The data ingestions service 228 can facilitate ingestion, formatting, merging, or storage of data from an industrial device. The security service 230 may facilitate end-to-end security, authentication, or authorization between the industrial data analysis system 206 and other entities within the system 200. The operations service 232 may facilitate control and operation of industrial devices. The development service 234 may facilitate the development of industrial applications, by a development user, using the industrial data analysis system 206. As noted, the CoW data object module 236 may support CoW data objects that may be used by various services of the services modules 218, such as the asset service 224, the data ingestion services 228, or the analytics services 226, one or more of which may utilize machine-learning to perform operations.

The cloud platform module 220 may comprise a cloud framework that enables various functions of the industrial data analysis system 206 to be built, or operated, as cloud-based services, such as a platform-as-a-service (PaaS). For instance, the cloud platform module 220 may permit a ML-based cloud service to train a ML model on a CoW-DF data object containing industrial device data, or using the CoW-DF data object as input to the ML model to produce a prediction about an industrial device. The data infrastructure module 222 may comprise various computing resources, such as processing and data memory, that facilitate operation of the industrial data analysis system 206.

According to particular embodiments, CoW-DF comprises a special mutable data frame that provides a way to produce a shallow copy of a data frame. For instance, an embodiment may provide two choices of a shallow copy Y of a data frame X:Y is a canonical-shallow copy; or Y is a forked-shallow copy. Additionally, various embodiments implement the copy-on-write (CoW) concept described herein with respect to, for example:

a value of a data frame, hereafter referred to as a CoW data frame value data object;
    a row of a data structure, hereafter referred to as a CoW row data object; and
    a column of a data structure, hereafter referred to as a CoW column data object.

For some embodiments, a CoW column data object is used a building block for constructing a CoW-DF data object, a CoW data frame value data object, or a CoW row data object.

Example Structure of CoW-DF

Figure 3:
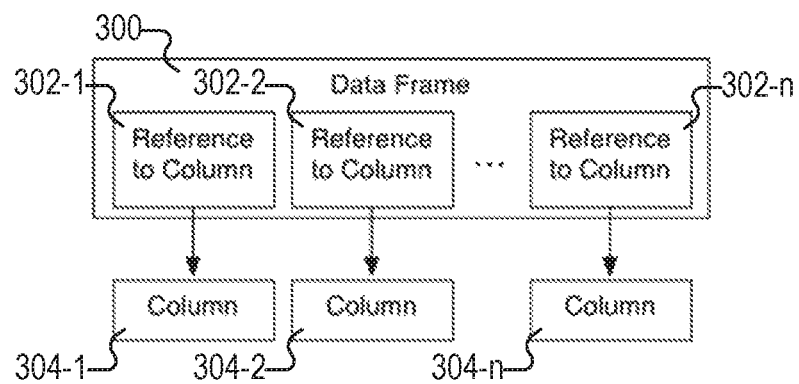
FIG. 3 is a block diagram illustrating an example copy-on-write data frame (CoW-DF) object, according to some embodiments.

For some embodiments, a CoW-DF comprises a collection of references to a set of column data objects. FIG. 3 is a block diagram illustrating an example CoW-DF data object 300, according to some embodiments. As illustrated, the CoW-DF 300 comprises a collection of references 302-1 through 302-*n* to a set of Column data objects 304-1 through 304-*n*. One or more of the references 302 may each comprise a reference-counted pointer. Additionally, the collection may include, without limitation, a list, vector, array, and the like.

Figure 4:
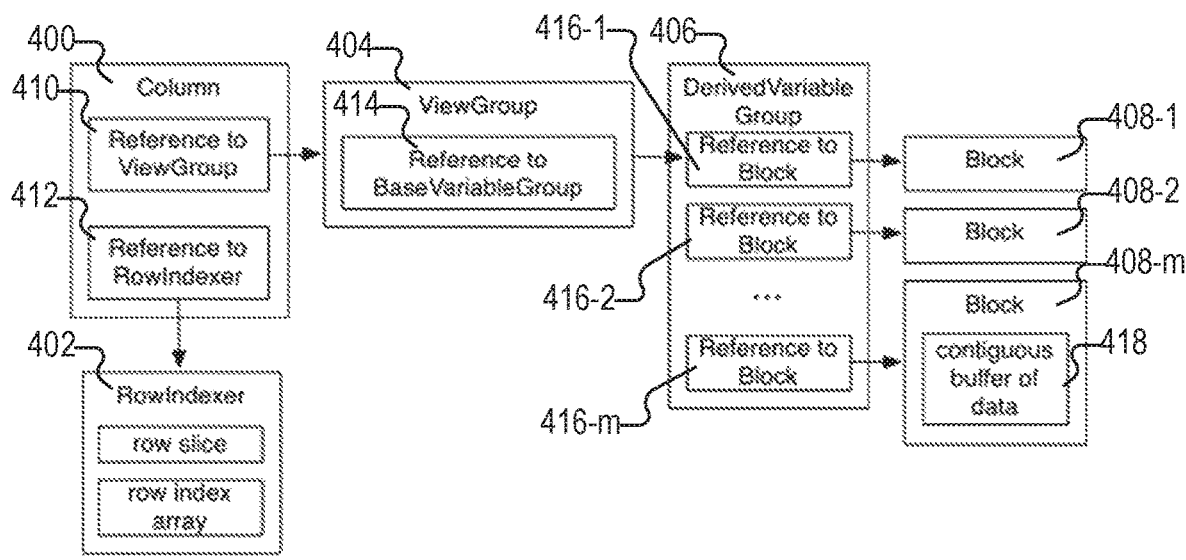
FIG. 4 is a block diagram illustrating an example column object, according to some embodiments.

For some embodiments, a Column data object comprises a reference to a row-indexer data object and a reference to a view-group data object. FIG. 4 is a block diagram illustrating an example Column data object 400, according to some embodiments, comprising a reference 412 to a RowIndexer data object 402 and a reference 410 to a ViewGroup data object 404. One or both of the references 410, 412 may each comprise a reference-counted pointer. The RowIndexer data object 402 may be used to slice the rows of a data object or specify the indices of the Column data object 400's view of the underlying data in the column.

As shown, the ViewGroup data object 404 comprises a reference 414 to a DerivedVariableGroup data object 406 that inherits from a BaseVariableGroup class. The reference 414 may comprise a reference-counted pointer. A BaseVariableGroup may comprise a base class interface, and a DerivedVariableGroup data object may comprise any type of data object that inherits from the BaseVariableGroup class and that comprises implementation-specific details to manage the data of the column the data object. According to some embodiments, two columns of the same data type may have different derived implementation types of a BaseVariableGroup interface. For instance, an example derived implementation types can include, without limitation, one that handles sparse numeric data, another that handles sparse numeric data, and another that handles dense data cached on disk.

The structure of a DerivedVariableGroup and a BaseVariableGroup may be similar to, or derived from, a VariableGroup as described by U.S. Pat. No. 9,547,830, entitled "Scalable, memory-efficient machine learning and prediction for ensembles of decision trees for homogeneous and heterogeneous datasets." A data object of the type VariableGroup can group together data having the same variable data type (VDT), having the same variable characteristic type (VCT) (semantic type of value, such as dates, real numbers, Boolean, integers, and categories), or having the same variable group storage characteristics (VGSC). VDT can refer to the type of data used to store a single data value, such as int32 or int64. VCT can refer to the semantic type of data values, such as dates, real numbers, Booleans, integers, and categories, and not the data type (e.g., VDT). VGSC can may define how the VDTs are stored. For instance, the VGSC of a VariableGroup data object may be such that data of the VariableGroup is stored to be sparse, contiguously laid out in memory, or dis-contiguous laid out in memory. The data grouped by a VariableGroup data object can represent individual variables, such as features, labels, instances, weights, and costs for predictions.

By indirection of the ViewGroup data object 404 to the DerivedVariableGroup data object 406 that inherits from a BaseVariableGroup class, enables some embodiments to receive a CoW-DF, CoW Column, CoW Row, or CoW Data Frame Value X and generate from it a: canonical-shallow copy Y; or forked-shallow copy Y.

In particular, with respect to canonical-shallow copy Y, an embodiment may copy a reference (e.g., 410) of X's ViewGroup data object (e.g., 404) to Y's ViewGroup reference and, as a result, X and Y will point to the same ViewGroup data object. This operation can increase the reference count associated with a reference (e.g., 410) to the ViewGroup data object (e.g., 404) by one.

When a canonical-shallow copy is made from the Column data object 400, another reference may be generated to the ViewGroup data object 404, but it may have a reference (e.g., 412) to a different RowIndexer data object, such as if the rows are sliced differently.

With respect to forked-shallow copy Y, an embodiment may create a new ViewGroup data object and may copy the reference (e.g., 414) to X's DerivedVariableGroup data object (e.g., 406) to Y's DerivedVariableGroup reference. As a result, X and Y will point to different ViewGroup data objects, but, initially, these two ViewGroup data objects will point to the same DerivedVariableGroup data object that inherits from a BaseVariableGroup class. This operation can increase the reference count associated with a reference (e.g., 414) to the DerivedVariableGroup data object (e.g., 406) by one, at least initially.

As shown, the DerivedVariableGroup data object 406 comprises a set of references 416-1 through 416-*m* to blocks 408-1 to 408-*m*. One or more of the references 416 may each comprise a reference-counted pointer. Additionally, one or more of the blocks 408 may each comprise a raw byte buffer where data is stored. According to some embodiments, a given block 408-*m* can live in a process memory, shared memory, or a memory-mapped region of memory. In FIG. 4, the block 408-*m* comprises a contiguous buffer of data 418, which represents a raw byte buffer for storing data.

Figure 5:
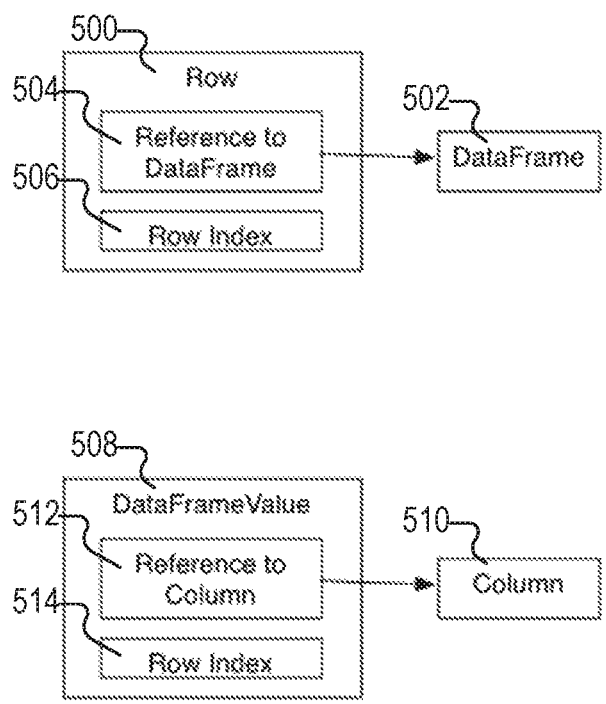
FIG. 5 is a block diagram illustrating an example copy-on-write (CoW) row object and an example copy-on-write (CoW) DataFrameValue object, according to some embodiments

FIG. 5 is a block diagram illustrating an example copy-on-write (CoW) row data object 500, according to some embodiments, comprising a Row Index data object 506 and a reference 504 to a DataFrame data object 502. The reference 504 may comprise a reference-counted pointer.

The block diagram of FIG. 5 also illustrates an example copy-on-write (CoW) DataFrameValue data object 508, according to some embodiments, comprising a Row Index data object 514 and a reference 512 to a Column data object 510. The reference 512 may comprise a reference-counted pointer. The CoW DataFrameValue data object 508 can be used to represent a value at a specific row and column of a data frame. For instance, DataFrameValue data object 508 may point to a cell in a DataFrame data object. In this way, the DataFrameValue data object 508 can be used as a helper data object so elements of a DataFrame data object can be easily modified by other procedures without needing to send a DataFrame data object itself to such a procedure.

Canonical-Shallow Copy Operations

As described herein, a canonical-shallow copy may reuse the ViewGroup data object of the CoW Column from which the copy was derived, rather than generate a new ViewGroup data object.

1. Subset of Rows

The following describes example operations where a new data object Y of a DataFrame data object may be generated from an existing DataFrame data object X that represents a subset of rows of X.

Y=X[r]: Y appears like X but only includes rows of X defined by the sequence of row indices r (array, list, etc.).

Y=X[start:stop]: Y appears like X but only includes rows of X starting with row index start and ending with row index stop (exclusive).

Y=X[start:stop:step]: Y appears like X but only includes rows of X starting with row index start and ending row index stop (exclusive), and a step step.

Each of the operations above may create a new DataFrame data object Y. For each Column data object in X, a new Column data object Y may be created. The pointer to the ViewGroup data object of X may be copied so that X and Y refer to the same ViewGroup data object (and thus the same VariableGroup). A new RowIndexer data object in Y may be generated from X's RowIndexer data object in such a way to generate as few RowIndexer data objects for Y as possible to save memory. For some embodiments, this is achieved by hashing the RowIndexer pointers so that only a single RowIndexer is generated from each unique RowIndexer throughout the Column data objects of X.

In addition, the following describes example operations where a Column data object Y can be generated that represents a subset of rows of another Column data object X.

Y=X[r]: Y appears like X but only includes rows of X defined by the sequence of row indices r (array, list, etc.).

Y=X[start:stop]: Y appears like X but only includes rows of X starting with row index start and ending with row index stop (exclusive).

Y=X[start:stop:step]: Y appears like X but only includes rows of X starting with row index start and ending row index stop (exclusive), and a step step.

2. Subset of Columns

The following describes example operations where a new data object Y of a DataFrame data object may be generated from an existing DataFrame data object X that represents a subset of Column data objects of X.

Y=X[c]: Y appears like X but only includes columns of X defined by the sequence of column names c (array, list, etc.).

Y=X.ignore_columns(c): Y appears like X but only does not include columns of X with names in a sequence of column names c (array, list, etc.).

Each of the operations above may create a new DataFrame data object Y. For each Column data object in X, a new Column data object Y may be created. Since there may be no row subsetting for each of these row operations, the pointer to the RowIndexer may be copied.

3. Subset of Rows and Columns

The following describes example operations where a new data object Y of a DataFrame data object may be generated from an existing DataFrame data object X that represents a subset of rows and columns of X.

Y=X[r,c]: Y appears like X but only includes rows of X defined by the sequence of row indices r (array, list, etc.) and columns with names defined by the sequence of names c.

Y=X[start:stop,c]: Y appears like X but only includes rows of X starting with row index start and ending with row index stop (exclusive).

Y=X[start:stop:step,c]: Y appears like X but only includes rows of X starting with row index start and ending row index stop (exclusive), and a step step.

Each of the operations above may create a new DataFrame data object Y. For each Column data object in X, a new Column data object Y is created.

The pointer to the ViewGroup of X may be copied so that X and Y refer to the same ViewGroup data object (and thus the same VariableGroup). A new RowIndexer data object in Y may be generated from X's RowIndexer data object in such a way to generate as few RowIndexer data objects as possible to save memory. For some embodiments, this is achieved by hashing the RowIndexer pointers so that only a single RowIndexer is generated from each unique RowIndexer throughout the Column data objects of X.

4. Accessing a Specific Column

The following describes example operations where a new Column data object Y may be generated from an existing Column data object in a DataFrame data object X that represents a subset of rows of X.

Y=X[c]: Y is a copy of the Column data object in X with name c. It may belong to the same ViewGroup as the original Column data object and the pointer to the Column data object's RowIndexer data object is copied into Y.

Y=X[r,c]: This is equivalent of X[c][r] with name c.

Y=X[start:stop,c]: This is equivalent of X[start:stop,c] with name c.

Y=X[start:stop:step,c]: This is equivalent of X[start:stop:step,c] with name c.

5. Renaming a Column

The following describes an example operation where a new Column data object Y may be generated from an existing Column data object X.

Y=X.rename(new_name)

By the foregoing operation, a new Column data object Y may be created. The pointers to the RowIndexer data object and ViewGroup data object may be copied from X into Y. As a result, X and Y may belong to the same view group associated with the ViewGroup data object.

6. Accessing a Specific Row

The following describes example operations where a new Row data object Y may be generated from an existing DataFrame data object X that represents a specific row in X.

Y=X[r]: where r is the row index of the row of interest.

Y=X[r,c]: where r is the row index of the row of interest and c is a sequence of columns. This may be equivalent to X[c][r].

7. Accessing a Specific Value

The following describes an example operation where a new DataFrameValue data object Y may be generated from an existing Column data object X that represents a value at a specific row in X.

Y=X[r]: where r is the row index of the row of interest.

The following describes an example operation where a new DataFrameValue data object Y may be generated from an existing DataFrame data object X that represents a value at a specific row and column in X.

Y=X[r,c]: where r is the row index of the row of interest and c is a sequence of columns. This may be equivalent to X[c][r].

8. Generating-Shallow Copies DataFrame, Row, or Column View

The following describes an example operation where a new Column data object Y may be generated from an existing Column data object X.

Y=X.copy( )

By the above operation, a new Column data object Y may be generated with Y's pointer to a RowIndexer data object being copied from X's pointer to a RowIndexer object. X and Y may share the same ViewGroup data object (and thus the same VariableGroup).

The following describes an example operation where a new Row data object Y may be generated from an existing Row data object X.

Y=X.copy( )

By the above operation, a new Row data object Y may be generated with the row index copied and the pointer to the DataFrame data object copied.

The following describes an example operation where a new DataFrame data object Y may be generated from an existing DataFrame data object X.

Y=X.copy( )

By the above operation, a new DataFrame data object Y may be generated. For each column in X, a new Column data object Y may be generated. The pointer to the ViewGroup data object may be copied so that X and Y refer to the same ViewGroup (and thus the same VariableGroup). No new RowIndexer data objects may be created, and the pointers may be simply copied.

Forked-Shallow Copy Operations

Various embodiments provide for copy-on-write (CoW) "forking" of a DataFrame data object, Column data object, or Row data object. When a data object of at least one of these types is forked, the fork may belong to a newly created ViewGroup data object.

1. DataFrame Forking

The following describes an example operation where a new forked DataFrame data object Y may be generated from an existing DataFrame data object X:

Y=X.fork( )

By the above operation, a DataFrame data object Y may be generated but Y and X may belong to different ViewGroup data objects. A Column data object may be generated in Y for each column in X. Additionally, for each column C data object in X, a new ViewGroup data object may be generated with the same BaseVariableGroup pointer as C's BaseVariableGroup pointer.

2. Column Forking

The following describes an example operation where a new forked Column data object Y from an existing Column data object X:

Y=X.fork( )

By the above operation, a Column data object Y may be generated, and Y and X may belong to different ViewGroup data objects. For this Column data object Y, a new ViewGroup data object may be generated with the same BaseVariableGroup pointer as X's ViewGroup data object.

3. Row Forking

The following describes an example operation where a new forked Row data object Y may be generated from an existing Row data object X:

Y=X.fork( )

By the above operation, Y and X may belong to different ViewGroup data objects. As noted herein, a Row data object may comprise a data structure (e.g., struct) with a pointer to a data frame and an integer representing the row referred. Accordingly, a Row data object may be forked by forking the data frame to which the Row data object points, and copying the reference to the data frame fork into a new Row object Y. Where Z is the DataFrame data object pointed to by X and X is forked, a Row data object Y may be generated with its DataFrame pointer referring to Z.

Mutation Operations on DataFrame, Row, Columns

The description above describes various operations that can generate canonical-shallow copies and forked-shallow copies of CoW-DataFrame data objects, CoW column data objects, and CoW row data objects. The following description describe various operations for of modifying at least one of these data object types.

Operation ModifyColumn: Suppose a request is made to modify the data content of a Column data object X, and let Q be the BaseVariableGroup of the ViewGroup data object of X. There may be either two cases: (A) more than one ViewGroup data object points to Q or (B) one only ViewGroup points to Q. If (A), the DerivedVariableGroup may be copied into a new DerivedVariableGroup data object R, which may involve copying Q's blocks into R. After, the data content of blocks in R may be modified. Subsequently, when a block S referenced by R is to be modified as a result of a write transaction with respect to Column data object X, a new block T is allocated of the same size as S, the data content of S is copied byte-by-byte into T, and the reference in R to block S is replaced or modified to point to new block T. Modifications resulting from the write transaction can then be applied to the new block T. This can be done for every block referenced in R that must be changed as a result of the write transaction. If (B), the data content of blocks in Q may be modified.

Operation ModifyDataSet: Suppose a request is made to modify the data content of a DataFrame data object X. For every Column data object in X that is modified, the steps of operation ModifyColumn may be performed.

By each of the above operations, Y and X may belong to different ViewGroup data objects. In particular, with respect to Column data object forking, a new ViewGroup data object may be created with the same ViewGroup reference. With respect to DataFrame data object forking, when a DataFrame data object X is forked, a new DataFrame data object Y may be created comprising a fork of each Column data object referenced by the DataFrame data object X. With respect to Row data object forking, when a Row data object X is forked, a DataFrame data object referenced by the Row data object X is copied into a new Row data object Y.

VariableGroup Abstraction

According to various embodiments, VariableGroup abstraction as described herein, such as with respect to FIG. 2, permits a DataFrame data object to mix a combination including, without limitation, two or more of the following:

a) a dense column represented by an array of values—this is a common format for many data frame applications, and may be ideal when there is little sparsity in a column;

b) a sparse column represented by two arrays, where the first is a values array and the second is an array of indices—this may be suitable when most of the values of a column are the same, such as when determining the frequency that a word appears in a document, which is often sparse.

c) a column with some data cached in a process's memory heap with other data stored on disk;

d) a column with some data cached in an interprocess shared memory data object with other data stored on disk;

e) a column with some data cached in memory with other data residing on tertiary storage, such a distributed data store;

f) a column of text that is optimized for large strings, such as e-mail messages and documents;

g) a column of text that is optimized for small strings such as words;

h) a column of text that is optimized for immutability;

i) a column of boolean values;

j) a column of integer values that is immutable and has a fixed bit-width;

k) a column of integer values with a bit-width that can expand as data is modified in the column;

l) a column of categorical data where the number of categorical levels is fixed and the string names of the levels do not change—this can permit for an optimized fixed encoding of the categorical values;

m) a column of categorical data where the number of categorical levels can change by addition or removal of levels;
n) a column that contains floating-point data including complex numbers;
o) a column that contains datetime values—this column comprises meta-data to represent the period (e.g., number of tick units per second) and phase offset (e.g., the time that the first offset represents) for all datetime values in the column;
p) a column that comprises duration values—the period (e.g., number of tick units per second) of all duration values in the column is represented;
q) a column where each individual value is a fixed-length bitmap;
r) a column where each individual value is a variable-length bitmap;
s) a column where each individual value is a dense vector of integer type, floating point type, categorical type, string type, or date type;
t) a column where each individual value is a sparse vector of integer type, floating point type, categorical type, string type, or date type;
u) a column where each individual value is a sparse matrix of integer type or floating point type;
v) dense matrices of integer type or floating point type;
w) a column where each individual value is an n-dimensional array of numbers, categoricals, text, datetimes, or durations;
x) a column where each individual value is a (key, value) mapping, where the key type can be a string, an integer, a datetime, a duration, a categorical level, or tuples of any combination of the foregoing, and the value type can be numbers, booleans, text, categorical values, n-dimensional arrays, or lists of n-dimensional arrays.
y) a column where each individual value is a list of numbers, categoricals, text, datetimes, durations, booleans, or tuples of any combination.

The foregoing describes some example benefits of abstracting the implementation details of a Column data object using ViewGroup. The foregoing list is not an exhaustive list, and an embodiment may be chosen according to the problem at hand.

Figure 6:
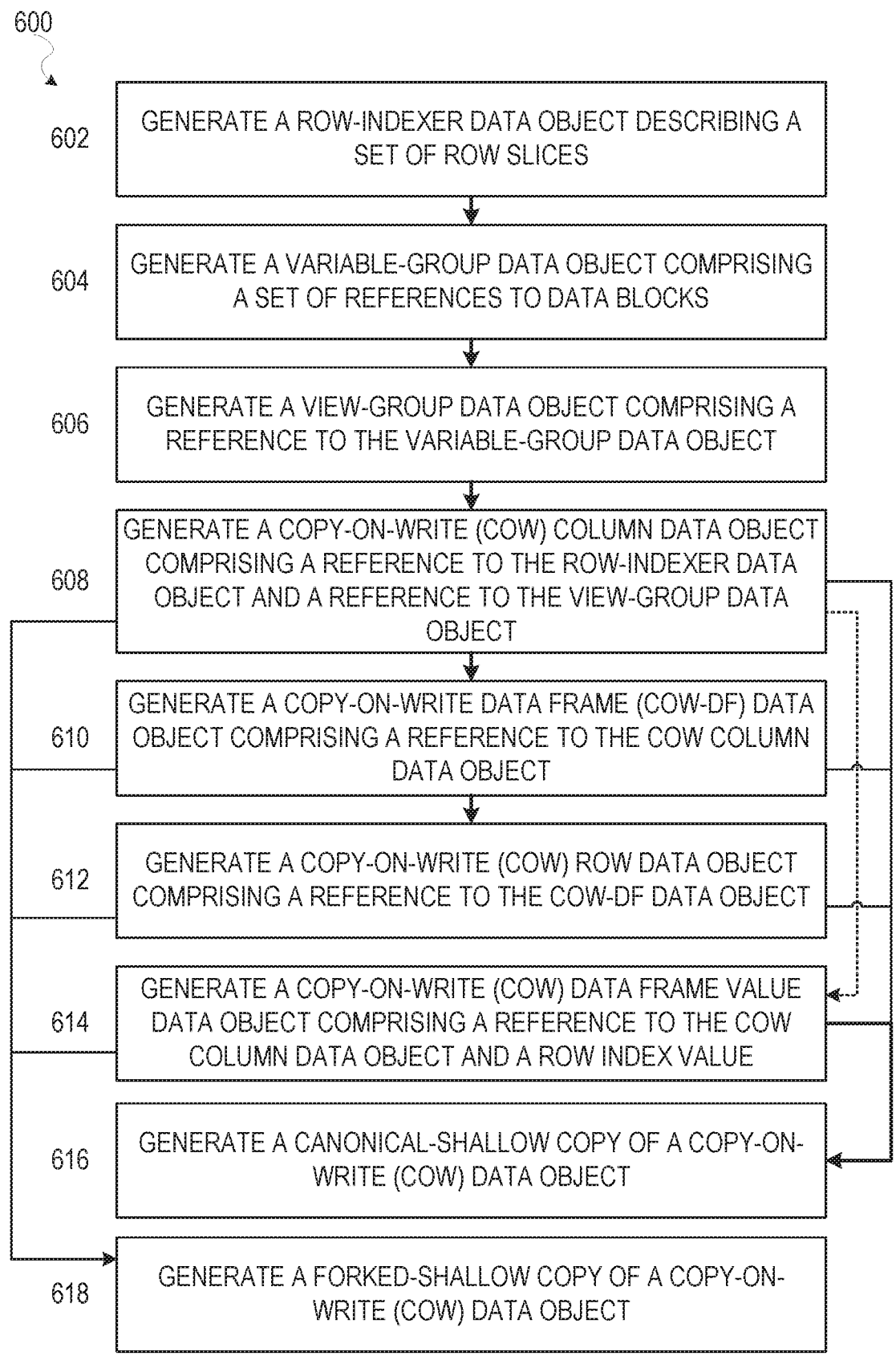
FIGS. 6-7 are flowcharts illustrating example methods for copy-on-write (CoW) data objects, according to some embodiments.
Figure 7:
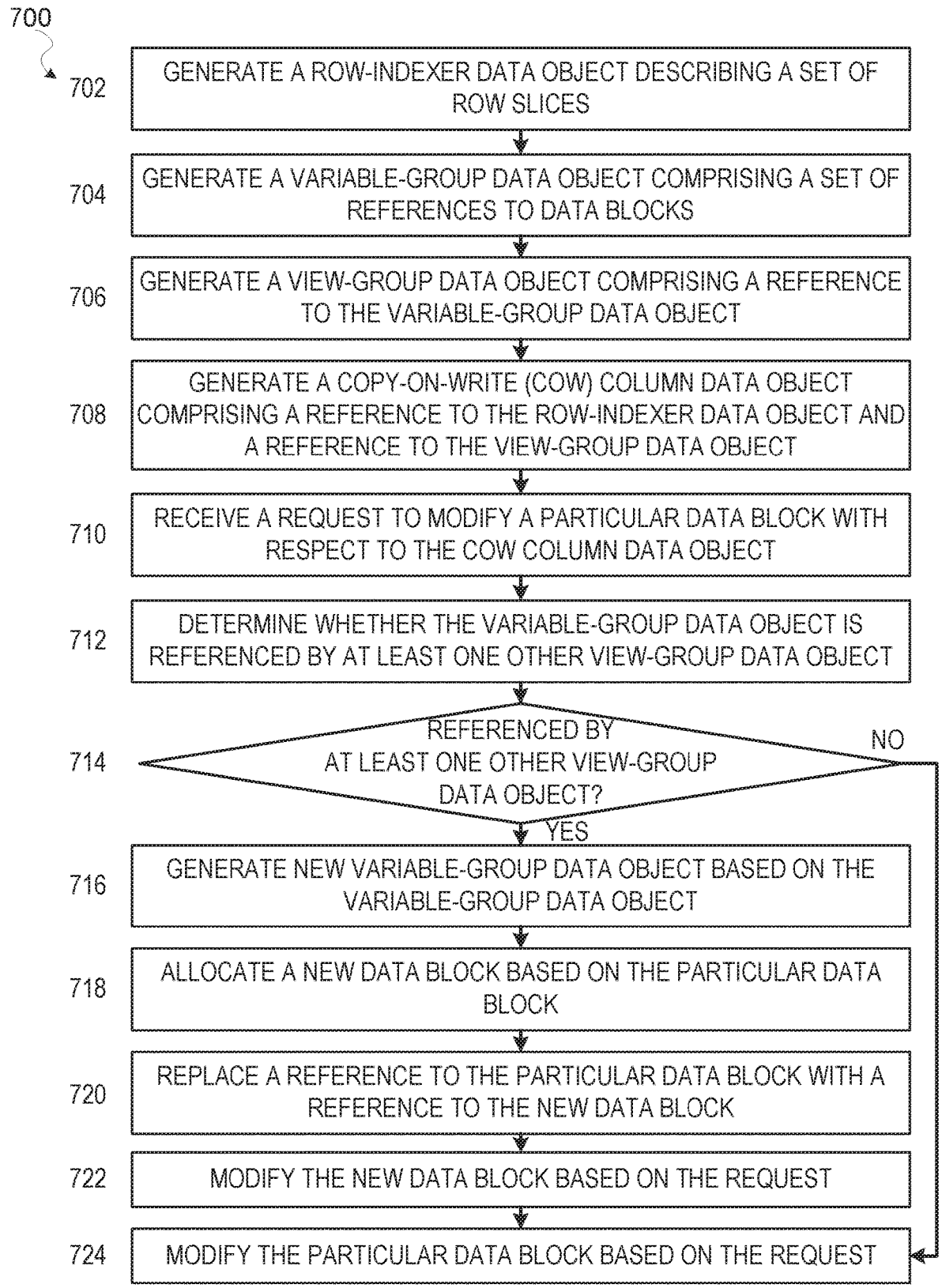

FIGS. 6-7 are flowcharts illustrating example methods for CoW data objects, according to some embodiments. It will be understood that example methods described herein may be performed by a device, such as a computing device executing instructions of an industrial device data analysis system, in accordance with some embodiments. Additionally, example methods described herein may be implemented in the form of executable instructions stored on a computer-readable medium or in the form of electronic circuitry. For instance, the operations of a method 600 of FIG. 6 may be represented by executable instructions that, when executed by a processor of a computing device, cause the computing device to perform the method 600. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel. For various operations of examples methods described herein, the generation of a data object may involve the creation and subsequent storage of the data object on to hardware memory, such as random-access memory (RAM) of a computing device.

Referring now to FIG. 6, the flowchart illustrates the example method 600 for CoW data objects, according to some embodiments. In particular, the method 600 may be performed to generate a CoW data object, such as a CoW column data object, a CoW-DF data object, a CoW row data object, a CoW data frame value data object, or a copy thereof. For some embodiments, the method 600 is performed as part of a module that supports CoW data object. An operation of the method 600 may be performed by a hardware processor (e.g., central processing unit or graphics processing unit) of a computing device.

The method 600 as illustrated begins with operation 602 generating a row-indexer data object that describes a set of row indices associated with the row-indexer data object. For instance, a row-indexer data object may be used to describe indices of rows, and specific indices, provided by a column data object, which provides a view of a data within a particular column of a data object, such as a data frame data object. In this way, a row-indexer data object may represent the result of slicing a row.

The method 600 continues with operation 604 generating a variable-group data object that comprises a set of references to data blocks. Each of the references in the set may comprise a reference-counted pointer to a data block, and each data block may comprise a contiguous buffer of data. Additionally, the set of references may be implemented by a list, vector, an array, or the like.

The method 600 continues with operation 606 generating a view-group data object that comprises a reference to the variable-group data object generated at operation 604. The reference to the variable-group data object may comprise a reference-counted pointer to the variable-group data object.

The method 600 continues with operation 608 generating a copy-on-write (CoW) column data object that comprises a reference to the row-indexer data object, generated at operation 602, and a reference to the view-group data object, generated at operation 606. The reference to the row-indexer data object may comprise a reference-counted pointer to the row-indexer data object, and the reference to the view-group data object may comprise a reference-counted pointer to view-group data object. Each CoW column data object generated by operation 608 may be used individually or, as illustrated by operations 610 through 614, could be used by some embodiments to generate (e.g., construct) other types CoW data objects.

From operation 608, the method 600 may continue with operation 610 generating a copy-on-write data frame (CoW-DF) data object that comprises a set of references to column data objects, which includes a reference to the CoW column data object generated at operation 608. Each of the references in the set may comprise a reference-counted pointer to a different CoW column data object generated by operation 608. Additionally, the set of references may be implemented by a list, vector, an array, or the like. It will be understood that for a given CoW-DF, the set of references can comprise zero or more references to CoW column data objects. Additionally, forking a CoW-DF as described herein may involve looping over each column data object referenced by the CoW-DF and forking each column data object individually, such that the resulting forked CoW-DF comprises a set (e.g., collection) of references to the forked column data objects.

Alternatively, from operation 608, the method 600 may continue with operation 614 generating a copy-on-write (CoW) data frame value data object that comprises a reference to the CoW column data object, generated at operation 608, and a row index value. The reference to the CoW column data object may comprise a reference-counted pointer to the CoW column data object.

From operation 610, the method 600 may continue with operation 612 generating copy-on-write (CoW) row data object the comprises a reference to the CoW-DF data object generated at operation 610. The reference to the CoW-DF data object may comprise a reference-counted pointer to the CoW-DF data object. The CoW data frame value data object may represent a value at a specific row and column of a data frame.

From either operation 608, 610, 612, or 614, the method 600 may continue with operation 616 generating a canonical-shallow copy of a CoW data object. For instance, from operation 608, the method 600 may continue with operation 616 generating a canonical-shallow copy of the CoW column data object generated by operation 608. The canonical-shallow copy of the CoW column data object may comprise a reference to the view-group data object (of the CoW column data object) generated at operation 606. Additionally, the canonical-shallow copy of the CoW column data object may comprise a new CoW column data object generated such that the new CoW column data object references the row-indexer data object of the CoW column data object. The canonical-shallow copy, of the CoW column data object, may represent a subset of rows of the CoW column data object, or a renamed version of the of the CoW column data object.

From operation 610, the method 600 may continue with operation 616 generating a canonical-shallow copy of the CoW-DF data object generated by operation 610. The canonical-shallow copy of the CoW-DF data object may comprise a new CoW-DF data object generated such that for each particular CoW column data object referenced by the CoW-DF data object, the new CoW-DF data object comprises a reference to a new CoW column data object, and the new CoW column data object references the same view-group data object as the particular CoW column data object.

The canonical-shallow copy, of the CoW-DF data object, may represent a subset of rows of the CoW-DF data object, may represent a subset of columns of the CoW-DF data object, or may represent a subset of rows and a subset of columns of the CoW-DF data object.

From operation 612, the method 600 may continue with operation 616 generating a canonical-shallow copy of the CoW row data object generated by operation 612. The canonical-shallow copy of the CoW row data object may comprise a new CoW row data object generated such that the new CoW row data object may comprise a copy of the row index of the CoW row data object, and a reference to the same CoW-DF data object as the CoW row data object.

From operation 614, the method 600 may continue with operation 616 generating a canonical-shallow copy of the CoW data frame value data object generated by operation 614. The canonical-shallow copy of the CoW data frame value data object may comprise a new CoW data frame value data object generated such that the new CoW data frame value data object may comprise a copy of the row index of the CoW data frame value data object, and a reference to the same CoW column data object as the CoW data frame value data object.

From either operation 608, 610, 612, or 614, the method 600 may continue with operation 618 generating a forked-shallow copy of a CoW data object.

For instance, from operation 608, the method 600 may continue with operation 618 generating a forked-shallow copy of the CoW column data object generated by operation 608. The forked-shallow copy of the CoW column data object may comprise a reference to a new view-group data object, which comprises a reference to the variable-group data object (of the CoW column data object) generated by operation 604. In particular, the forked-shallow copy of the CoW column data object may comprise a new column data object generated such that the new column data object comprises a reference to a new view-group data object and the new view-group data object comprises a reference to the variable-group data object of the CoW column data object.

From operation 610, the method 600 may continue with operation 618 generating a forked-shallow copy of the CoW-DF data object generated by operation 610. The forked-shallow copy of the CoW-DF data object may comprise a new CoW-DF data object generated such that for each particular CoW column data object referenced by the CoW-DF data object, a new CoW column data object is generated, and each new CoW column data object may comprise a reference to a new view-group data object referencing the same variable-group data object as the view-group data object of the particular CoW column data object.

From operation 612, the method 600 may continue with operation 618 generating a forked-shallow copy of the CoW row data object generated by operation 612. The forked-shallow copy of the CoW row data object may comprise a new CoW row data object generated such that the new CoW row data object comprises a reference to a forked-shallow copy of the CoW-DF data object referenced by the CoW row data object.

Referring now to FIG. 7, the flowchart illustrates the example method 700 for CoW data objects, according to some embodiments. In particular, the method 700 may be performed to generate a CoW data object, such as a CoW column data object, and subsequent modification of the CoW data object. For some embodiments, the method 700 is performed as part of a module that supports CoW data object. An operation of the method 700 may be performed by a hardware processor of a computing device.

The method 700 as illustrated begins with operations 702 through 708, which according to some embodiments, are respectively similar to operation 602 through 608 of the method 600 described above with respect to FIG. 6.

The method 700 continues with operation 710 receiving a request to modify a particular data block with respect to the CoW column data object. The request to modify the particular data block with respect to the CoW column data object may be part of a larger request to modify a multiple data blocks with respect to the CoW column data object. Additionally, the request to modify the particular data block with respect to the CoW column data object may be part of a larger request to modify a plurality of CoW column data objects associated with a CoW data frame data object.

The method 700 continues with operation 712 determining whether the variable-group data object is referenced by at least one other view-group data object. The reference may comprise a reference-counted pointer, and the determining may be based on the count associated with the reference-counted pointer. For instance, where a count associated with the reference-counted pointer comprises a value of two or larger, this may indicate that the variable-group data object is referenced by at least one other view-group data object. Additionally, the count of two or higher may indicate at least two copies of the CoW column data object presently exists.

At 714, if the variable-group data object Q is referenced by at least one other view-group data object, the method 700 continues with operation 716 generating a new variable-group data object based on the variable-group data object generated by operation 704. From operation 716, the method 700 continues with operation 718 allocating a new data block based on the particular data block requested to be modified at operation 710. For some embodiments, allocating the new data block based on the particular data block comprises allocating the new data block to have a data size at least equal to a data size of the particular data block, and copying (e.g., byte-by-byte) data content of the particular data block to the new data block.

For some embodiments, all data blocks of the variable-group data object of the CoW column data object generated at operation 708, including the particular data block requested to be modified, are copied to the new variable-group data object generated at operation 716. For some such embodiments, the CoW column is implemented such it comprises a single view-group data object. For alternative embodiments, a CoW column is implemented such that a view-group data object is maintained for each block and only the data block being modified is copied to the new variable-group data object generated operation 716.

From operation 718, the method 700 continues with operation 720 replacing, in the new variable-group data object, a reference to the particular data block (requested to be modified) with a reference to the new data block allocated at operation 718. From operation 720, the method 700 continues with operation 722 modifying the new data block, allocated at operation 718, based on the request received at operation 710.

At 714, if the variable-group data object Q is now referenced by any other view-group data objects, the method 700 continues with operation 724 modifying the particular data block based on the request received at operation 710.

Figure 8:
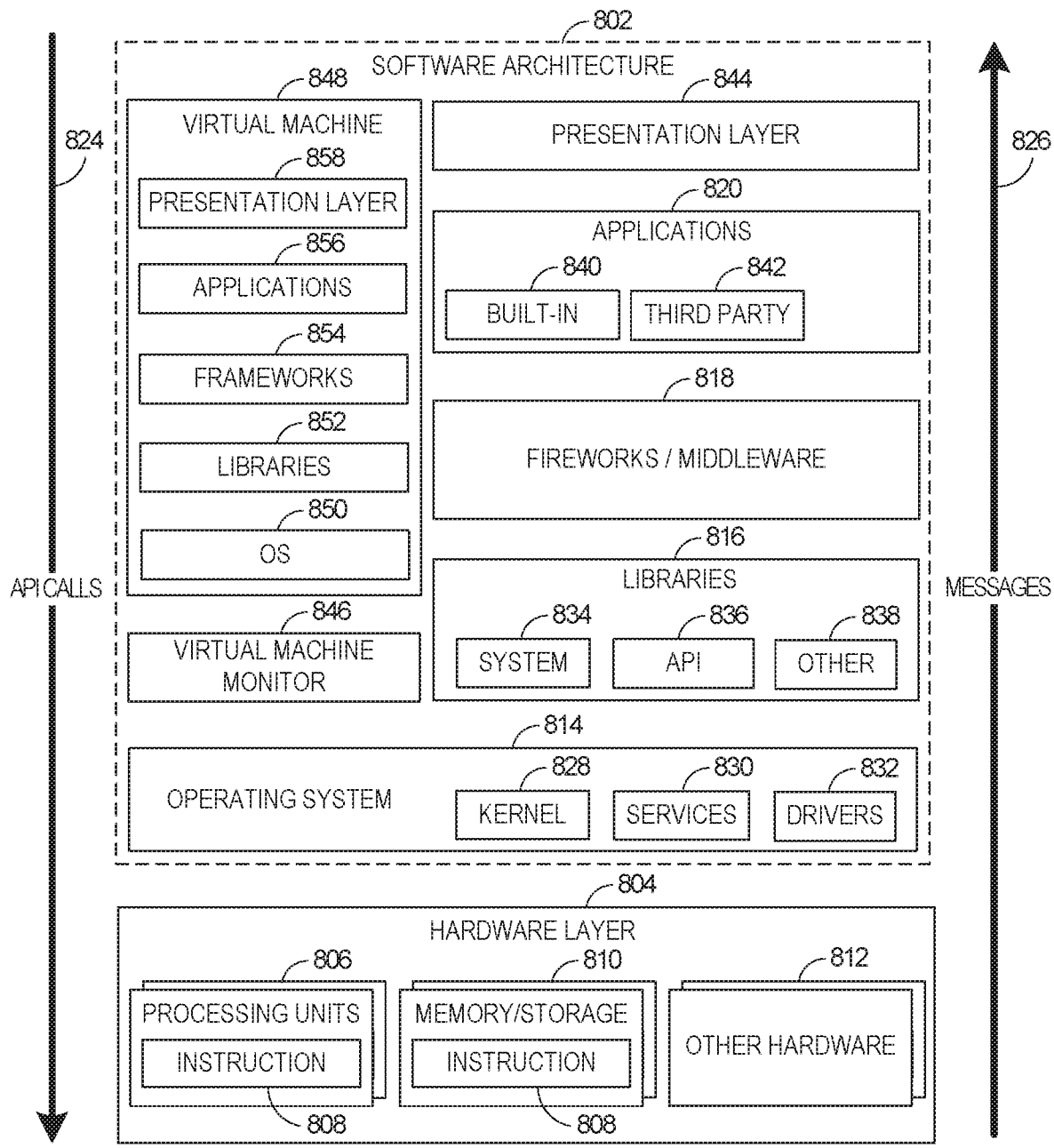
FIG. 8 is a block diagram illustrating an example software architecture, which may be used in conjunction with various hardware architectures herein described, according to various embodiments of the present disclosure.
Figure 9:
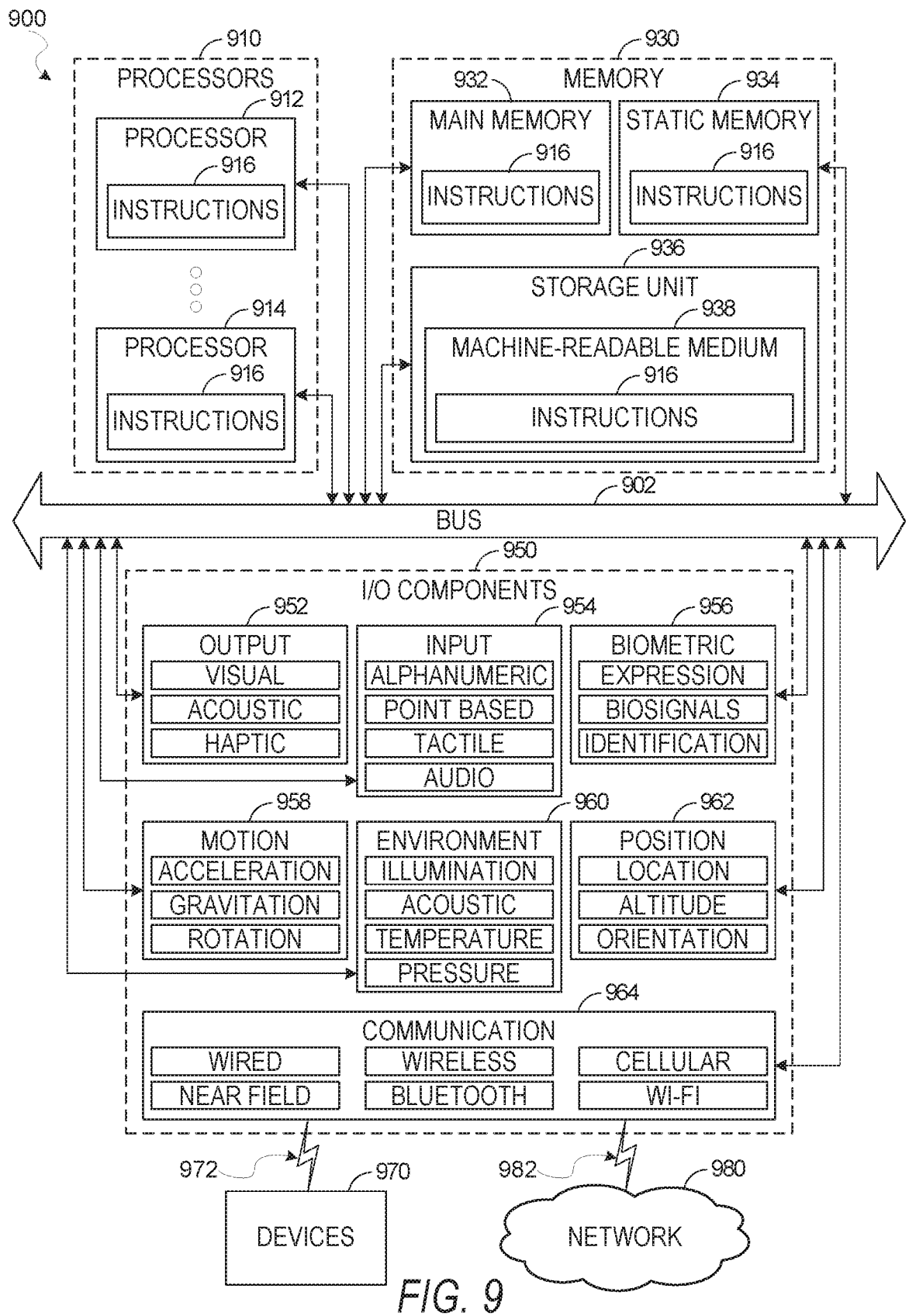
FIG. 9 is a block diagram illustrating components of an example machine able to read instructions from a machine storage medium and perform any one or more of the methodologies discussed herein, according to various embodiments of the present disclosure.

Various embodiments described herein may be implemented by way of the example software architecture illustrated by and described with respect to FIG. 8 or by way of the example machine illustrated by and described with respect to FIG. 9.

FIG. 8 is a block diagram illustrating an example of a software architecture that may be installed on a machine, according to some example embodiments. FIG. 8 is merely a non-limiting example of a software architecture, and it will be appreciated that many other architectures may be implemented to facilitate the functionality described herein. The software architecture 802 may be executing on hardware such as a machine 900 of FIG. 9 that includes, among other things, processors 910, memory 930, and I/O components 950. A representative hardware layer 804 is illustrated and can represent, for example, the machine 900 of FIG. 9. The representative hardware layer 804 comprises one or more processing units 806 having associated executable instructions 808. The executable instructions 808 represent the executable instructions of the software architecture 802, including implementation of the methods, modules, and so forth of FIG. 1. The hardware layer 804 also includes memory or storage modules 810, which also have the executable instructions 808. The hardware layer 804 may also comprise other hardware 812, which represents any other hardware of the hardware layer 804, such as the other hardware illustrated as part of the machine 900.

In the example architecture of FIG. 8, the software architecture 802 may be conceptualized as a stack of layers, where each layer provides particular functionality. For example, the software architecture 802 may include layers such as an operating system 814, libraries 816, frameworks/middleware 818, applications 820, and a presentation layer 844. Operationally, the applications 820 or other components within the layers may invoke API calls 824 through the software stack and receive a response, returned values, and so forth (illustrated as messages 826) in response to the API calls 824. The layers illustrated are representative in nature, and not all software architectures have all layers. For example, some mobile or special purpose operating systems may not provide a frameworks/middleware 818 layer, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than by interfacing directly with the underlying operating system 814 functionality (e.g., kernel 828, services 830, or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media formats such as MPEG4, H.264, MP3, AAC, AMR, JPG, PNG), graphics libraries (e.g., an OpenGL framework that may be used to render 8D and 9D graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 or other software components/modules. For example, the frameworks 818 may provide various graphic user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a home application, a contacts application, a browser application, a book reader application, a location application, a media application, a messaging application, or a game application.

The third-party applications 842 may include any of the built-in applications 840, as well as a broad assortment of other applications. In a specific example, the third-party applications 842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party applications 842 may invoke the API calls 824 provided by the mobile operating system such as the operating system 814 to facilitate functionality described herein.

The applications 820 may utilize built-in operating system functions (e.g., kernel 828, services 830, or drivers 832), libraries (e.g., system 834, APIs 836, and other libraries 838), or frameworks/middleware 818 to create user interfaces to interact with users of the system. Alternatively, or additionally, in some systems, interactions with a user may occur through a presentation layer, such as the presentation layer 844. In these systems, the application/module "logic" can be separated from the aspects of the application/module that interact with the user.

Some software architectures utilize virtual machines. In the example of FIG. 8, this is illustrated by a virtual machine 848. A virtual machine 848 creates a software environment where applications/modules can execute as if they were executing on a hardware machine e.g., the machine 900 of FIG. 9, for example). A virtual machine 848 is hosted by a host operating system (e.g., operating system 814) and typically, although not always, has a virtual machine monitor 846, which manages the operation of the virtual machine 848 as well as the interface with the host operating system (e.g., operating system 814). A software architecture executes within the virtual machine 848, such as an operating system 850, libraries 852, frameworks/middleware 854, applications 856, or a presentation layer 858. These layers of software architecture executing within the virtual machine 848 can be the same as corresponding layers previously described or may be different.

Some or all of a software architecture 802 may be hosted in a cloud environment, which can deliver the software architecture 802 over a communications network as a service. A cloud environment may provide a computing environment, for example, where users can have access to applications or computing resources, as services, from anywhere through their connected devices. These services may be provided by entities called cloud services providers. Examples of services that may be provided via a cloud environment include, without limitation, infrastructure as a service (IaaS), platform as a service (PaaS), software as a service (SaaS), storage as a service (STaaS), security as a service (SECaaS), test environment as a service (TEaaS), and application program interface (API) as a service (APIaaS), among others.

FIG. 9 is a block diagram illustrating components of an example machine 900, according to some embodiments, able to read instructions 916 from a machine storage medium and perform any one or more of the methodologies discussed herein. Specifically, FIG. 9 shows a diagrammatic representation of the machine 900 in the example form of a computer system, within which the instructions 916 (e.g., software, a program, an application, an applet, an app, or other executable code) for causing the machine 900 to perform any one or more of the methodologies discussed herein may be executed. As such, the instructions 916 may be used to implement modules or components described herein. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment.

The machine 900 may comprise, but not be limited to, Internet-of-Things (IoT) device, which can include an IIoT device. As used herein, an IoT device can comprise a device embedded with hardware, software, or both that enables the device to collect and exchange data over a communications network (e.g., the Internet), where the data may relate to information about the device (e.g., its operation or diagnostics) or its environment, or the data exchange may facilitate remote control of the device. IIoT devices can include those devices used in industrial or manufacturing setting, professional settings, or the field such as medical devices (e.g., magnetic-resonance imaging (MRI) machine), aircraft engines, and wind turbines. Additionally, the machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 900 capable of executing the instructions 916, sequentially or otherwise, that specify actions to be taken by that machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory/storage 930, and I/O components 950, which may be configured to communicate with each other such as via a bus 902. The processors 910 may comprise a single processor or, as shown, comprise multiple processors (e.g., processors 912 to 914). The memory/storage 930 may include a memory 930, such as a main memory, or other memory storage, and a storage unit 936, both accessible to the processors 910 such as via the bus 902. The storage unit 936 and memory 930 store the instructions 916 embodying any one or more of the methodologies or functions described herein. The instructions 916 may also reside, completely or partially, within the memory 930, within the storage unit 936, within at least one of the processors 910 (e.g., within the processor 912's cache memory), or any suitable combination thereof, during execution thereof by the machine 900. Accordingly, the memory 930, the storage unit 936, and the memory of the processors 910 are examples of machine storage media.

The I/O components 950 may include a wide variety of components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further embodiments, the I/O components 950 may include biometric components 956, motion components 958, environment components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environment components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a communications network 980 or devices 970 via a coupling 972 and a coupling 982 respectively. For example, the communication components 964 may include a network interface component or other suitable device to interface with the communications network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

It will be understood that "various components" (e.g., modules) used in this context (e.g., system components) refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function or related functions. Components may constitute either software components (e.g., code embodied on a machine storage medium) or hardware components. A hardware component is a tangible unit capable of performing certain operations and may be configured or arranged in a certain physical manner. In various embodiments, one or more computer systems (e.g., a standalone computer system, a client computer system, or a server computer system) or one or more hardware components of a computer system (e.g., a processor 912 or a group of processors 910) may be configured by software (e.g., an application 820 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor 912 or other programmable processor 912. Once configured by such software, hardware components become specific machines (or specific components of a machine 900) uniquely tailored to perform the configured functions and are no longer general-purpose processors 910. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 912 configured by software to become a special-purpose processor, the general-purpose processor 912 may be configured as respectively different special-purpose processors (e.g., comprising different hardware components) at different times. Software accordingly configures a particular processor 912 or processors 910, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 910 that are temporarily configured (e.g., by software) or permanently configured to perform the relevant operations. Whether temporarily or permanently configured, such processors 910 may constitute processor-implemented components that operate to perform one or more operations or functions described herein. As used herein, "processor-implemented component" refers to a hardware component implemented using one or more processors 910. Similarly, the methods described herein may be at least partially processor-implemented, with a particular processor 912 or processors 910 being an example of hardware. For example, at least some of the operations of a method may be performed by one or more processors 910 or processor-implemented components. Moreover, the one or more processors 910 may also operate to support performance of the relevant operations in a "cloud computing" environment or as a "software as a service" (SaaS). For example, at least some of the operations may be performed by a group of computers (as examples of machines 900 including processors 910), with these operations being accessible via a communications network 980 (e.g., the Internet) and via one or more appropriate interfaces (e.g., an API). The performance of certain of the operations may be distributed among the processors 910, not only residing within a single machine 900, but deployed across a number of machines 900. In some embodiments, the processors 910 or processor-implemented components may be located in a single geographic location (e.g., within a home environment, an office environment, or a server farm). In other embodiments, the processors 910 or processor-implemented components may be distributed across a number of geographic locations.

"CLIENT DEVICE" in this context refers to any machine that interfaces to a communications network to obtain resources from one or more server systems or other client devices. A client device may be, but is not limited to, an IoT device (e.g., Industrial IoT device), a mobile phone, desktop computer, laptop, PDA, smart phone, tablet, ultra-book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 2G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long range protocols, or other data transfer technology.

"MACHINE STORAGE MEDIUM" in this context refers to a component, a device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine storage medium" should be taken to include a single medium or multiple media (e.g., a centralized or distributed database, or associated caches and servers) able to store instructions. The term "machine storage medium" shall also be taken to include any medium, or combination of multiple media, that is capable of storing instructions for execution by a machine, such that the instructions, when executed by one or more processors of the machine, cause the machine to perform any one or more of the methodologies described herein. Accordingly, a "machine storage medium" refers to a single storage apparatus or device, as well as "cloud-based" storage systems or storage networks that include multiple storage apparatus or devices or a combination of local and cloud-based storage systems that may communicate via a network connection.

The machine storage medium is non-transitory and, as such, excludes signals per se. A computer storage medium is an example of a machine storage medium. The term "communications medium" in this context includes modulated data signals and other carrier/communication experience elements. The term "machine-readable medium" in this context includes both a machine storage medium (e.g., a computer storage medium) and a communication medium.

"PROCESSOR" in this context refers to any circuit (e.g., hardware processor) or virtual circuit (e.g., a physical circuit emulated by logic executing on an actual processor) that manipulates data values according to control signals (e.g., "commands," "op codes," "machine code," etc.) and which produces corresponding output signals that are applied to operate a machine. A processor may, for example, be a central processing unit (CPU), a Reduced Instruction Set Computing (RISC) processor, a Complex Instruction Set Computing (CISC) processor, a graphics processing unit (GPU), a digital signal processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

According to some embodiments, a method comprises generating, by one or more hardware processors, a row-indexer data object on a hardware memory, where the row-indexer data object describes a set of row indices associated with the row-indexer data object. The method may further comprise generating, by the one or more hardware processors, a variable-group data object Q on the hardware memory, where the variable-group data object Q comprises a set of references to data blocks. The method may further comprise generating, by the one or more hardware processors, a view-group data object on the hardware memory, where the view-group data object comprises a reference to the variable-group data object Q. The method may further comprise generating, by the one or more hardware processors, a copy-on-write (CoW) data object X on the hardware memory, where the CoW data object X comprises a reference to the row-indexer data object and a reference to the view-group data object. For some embodiments, the CoW data object X comprises a copy-on-write (CoW) column data object.

For some embodiments, the method comprises generating, by the one or more hardware processors, a canonical-shallow copy Y on the hardware memory, where the canonical-shallow copy Y is generated from the CoW data object X such that the canonical-shallow copy Y comprises a reference to the view-group data object of the CoW data object X and such that the canonical-shallow copy Y represents a subset of rows of the CoW data object X.

For some embodiments, the method comprises generating, by the one or more hardware processors, a canonical-shallow copy Y on the hardware memory, where the canonical-shallow copy Y is generated from the CoW data object X such that the canonical-shallow copy Y comprises a reference to the view-group data object of the CoW data object X and such that the canonical-shallow copy Y represents a renamed version of the CoW data object X.

For some embodiments, the method comprises generating, by the one or more hardware processors, a forked-shallow copy Y on the hardware memory, where the forked-shallow copy Y is generated from the CoW data object X such that the forked-shallow copy Y comprises a reference to a new view-group data object, and where the new view-group data object comprises a reference to the variable-group data object Q of the CoW data object X.

For some embodiments, the method comprises generating, by the one or more hardware processors, a copy-on-write (CoW) data frame value data object Y on the hardware memory, where the CoW data frame value data object Y comprises a reference to the CoW data object X and a row index value.

For some embodiments, the method comprises generating, by the one or more hardware processors, a copy-on-write data frame (CoW-DF) data object Y on the hardware memory, where the CoW-DF data object Y comprises a set of references to column data objects, the set of references including a reference to the CoW data object X.

The method may further comprise generating, by the one or more hardware processors, a canonical-shallow copy Z on the hardware memory, where the canonical-shallow copy Z is generated from the CoW-DF data object Y such that the canonical-shallow copy Z comprises a reference to the view-group data object of the CoW data object X, and such that the canonical-shallow copy Z represents a subset of rows of the CoW-DF data object Y.

The method may further comprise generating, by the one or more hardware processors, a canonical-shallow copy Z on the hardware memory, where the canonical-shallow copy Z is generated from the CoW-DF data object Y such that the canonical-shallow copy Z comprises a reference to the view-group data object of the CoW data object X, and such that the canonical-shallow copy Z represents a subset of columns of the CoW-DF data object Y.

The method may further comprise generating, by the one or more hardware processors, a forked-shallow copy Z on the hardware memory, where the forked-shallow copy Z is generated from the CoW-DF data object Y such that forked-shallow copy Z comprises a reference to a new view-group data object, the new view-group data object comprising a reference to the variable-group data object Q of the CoW data object X.

The method may further comprise generating, by the one or more hardware processors, a copy-on-write (CoW) row data object Z on the hardware memory, where the CoW row data object Z comprises a reference to the CoW-DF data object Y. The method may further comprise generating, by the one or more hardware processors, a forked-shallow copy W on the hardware memory, where the forked-shallow copy W is generated from the CoW row data object Z such that forked-shallow copy W comprises a reference to a new view-group data object, the new view-group data object comprising a reference to the CoW-DF data object Y.

For some embodiments, the method comprises receiving, by the one or more hardware processors, a request to modify a particular data block S with respect to the CoW data object X, where the set of references to data blocks, of the variable-group data object Q, include a reference to the particular data block S on the hardware memory. The method may further comprise determining, by the one or more hardware processors, whether the variable-group data object Q is referenced by at least one other view-group data object. The method may further comprise in response to determining that the variable-group data object Q is referenced by at least one other view-group data object: generating, by the one or more hardware processors, a new variable-group data object R, on the hardware memory, based on the variable-group data object Q; allocating, by the one or more hardware processors, a new data block T, on the hardware memory, based on the particular data block S; replacing, by the one or more hardware processors, a reference, in the new variable-group data object R, to the particular data block S with a reference to the new data block T; and modifying, by the one or more hardware processors, the new data block T based on the request.

For some embodiments, generating the new variable-group data object R based on the variable-group data object Q comprises copying the set of references to data blocks from the variable-group data object Q to the new variable-group data object R.

For some embodiments, allocating the new data block T based on the particular data block S comprises: allocating the new data block T to have a data size at least equal to a data size of the particular data block S; and copying data content of the particular data block S to the new data block T.

For some embodiments, the method further comprises in response to determining that the variable-group data object Q is not referenced by any other view-group data object, modifying, by the one or more hardware processors, the particular data block S based on the request.

For some embodiments, the method further comprises generating, by the one or more hardware processors, a copy-on-write data frame (CoW-DF) data object Y on the hardware memory, where the CoW-DF data object Y comprises a set of references to column data objects, the set of references including a reference to the CoW data object X. The method may further comprise receiving, by the one or more hardware processors, a request to modify a particular data block S of the CoW data object X with respect to the CoW-DF data object Y, where the set of references to data blocks, of the variable-group data object Q, includes a reference to the particular data block S on the hardware memory. The method may further comprise determining, by the one or more hardware processors, whether the variable-group data object Q is referenced by at least one other view-group data object. The method may further comprise in response to determining that the variable-group data object Q is referenced by at least one other view-group data object, generating, by the one or more hardware processors, a new variable-group data object R, on the hardware memory, based on the variable-group data object Q; allocating, by the one or more hardware processors, a new data block T, on the hardware memory, based on the particular data block S; replacing, by the one or more hardware processors, a reference, in the new variable-group data object R, to the particular data block S with a reference to the new data block T; and modifying, by the one or more hardware processors, the new data block T based on the request.

According to some embodiments, a non-transitory computer-readable medium comprises instructions that, when executed by one or more processors of a machine, cause the machine to perform operations comprising: generating a row-indexer data object on a hardware memory, the row-indexer data object describing a set of row indices associated with the row-indexer data object; generating a variable-group data object on the hardware memory, the variable-group data object comprising a set of references to data blocks; generating a view-group data object on the hardware memory, the view-group data object comprising a reference to the variable-group data object; and generating a copy-on-write (CoW) data object X on the hardware memory, the CoW data object X comprising a reference to the row-indexer data object and a reference to the view-group data object.

According to embodiments, a system comprises a hardware memory; one or more hardware processors; a data ingestion module that causes the one or more hardware processors to receive and store data from an IIoT device; a copy-on-write (CoW) data object module that causes the one or more hardware processors to generate, on the hardware memory, a copy-on-write data frame (CoW-DF) data object Y by: generating row-indexer data object on a hardware memory, the row-indexer data object describing a set of row indices associated with the row-indexer data object; generating a variable-group data object on the hardware memory, the variable-group data object comprising a set of references to data blocks; generating a view-group data object on the hardware memory, the view-group data object comprising a reference to the variable-group data object; and generating, by the one or more hardware processors, a copy-on-write (CoW) data object X on the hardware memory, the CoW data object X comprising a reference to the row-indexer data object and a reference to the view-group data object; and generating the CoW-DF data object Y to comprise a set of references to column data objects, the set of references including a reference to the CoW data object X; and a data analysis module that causes the one or more hardware processors to copy at least a portion of the data from the IIoT device to the CoW data object X.

For some embodiments, the CoW data object module comprises a modification module to modify a column of the CoW-DF data object Y by: generating a canonical-shallow copy Z of the CoW-DF data object Y; and applying a modification to a corresponding column of the canonical-shallow copy Z, where the data analysis module comprises a machine learning (ML) module that generates prediction data from a ML model by using the canonical-shallow copy Z as input data. Alternatively, a forked CoW-DF of CoW-DF data object Y may be used as input data.

For some embodiments, the CoW data object module comprises a modification module to modify a column of the CoW-DF data object Y by: generating a canonical-shallow copy Z of the CoW-DF data object Y; and applying a modification to a corresponding column of the canonical-shallow copy Z, where the data analysis module comprises a machine learning (ML) module that trains a ML model on the canonical-shallow copy Z.

Alternatively, a forked CoW-DF of CoW-DF data object Y may be used to train the ML model. For instance, a forked CoW-DF may be created, used for one or more iterations of modifications and ML model training, without affecting the original CoW-DF data object Y. A forked CoW-DF of CoW-DF data object Y may be used for imputation of missing data. For example, sometimes sensors from IIoT devices do not record data (e.g., measurements), which results in some data values being null/missing. Though traditional imputation can be memory expensive, a CoW-DF of an embodiment may be used to reduce the cost of such imputation.

It will be understood that changes and modifications may be made to the disclosed embodiments without departing from the scope of the present disclosure. These and other changes or modifications are intended to be included within the scope of the present disclosure.

What is claimed is:

1. A method comprising:
    generating, by one or more processors, a row-indexer data object in a memory, the row-indexer data object describing a set of row indices associated with the row-indexer data object;
    generating, by the one or more processors, a variable-group data object in the memory, the variable-group data object comprising one or more references to data blocks;
    generating, by the one or more processors, a view-group data object in the memory, the view-group data object comprising a reference to the variable-group data object;
    generating, by the one or more processors, a copy-on-write (CoW) column data object on the hardware memory, the CoW column data object comprising a reference to the row-indexer data object and a reference to the view-group data object;
    generating a copy-on-write data frame (CoW-DF) data object that comprises a set of references to column data objects, which includes a reference to the CoW column data object, wherein the set of references are implemented by one or more of a list, a vector, and an array;
    generating a CoW row data object that comprises a reference to the CoW-DF data object and that represents a value at a specific row and column of a data frame;
    generating a CoW data frame value data object that comprises a reference to the CoW column data object and a row index value; and
    generating a canonical-shallow copy of the CoW data frame value data object that comprises a new CoW data frame value data object generated such that the new CoW data frame value data object comprises a copy of the row index of the CoW data frame value data object, and a reference to the CoW column data object.

2. The method of claim 1, further comprising:
    generating, by the one or more processors, a forked-shallow copy on the hardware memory, the forked-shallow copy being generated from the CoW column data object such that the forked-shallow copy comprises a reference to a new view-group data object, the new view-group data object comprising a reference to the variable-group data object of the CoW column data object.

3. The method of claim 1, further comprising:
    generating, by the one or more processors, a forked-shallow copy in the memory, the forked-shallow copy being generated from the CoW-DF data object such that forked-shallow copy comprises a reference to a new view-group data object, the new view-group data object comprising a reference to the variable-group data object of the CoW data object.

4. The method of claim 1, further comprising:
    generating, by the one or more processors, a forked-shallow copy in the memory, the forked-shallow copy being generated from the CoW row data object such that forked-shallow copy comprises a reference to a new view-group data object, the new view-group data object comprising a reference to the CoW-DF data object.

5. The method of claim 1, further comprising:
    receiving, by the one or more hardware processors, a request to modify a particular data block with respect to the CoW column data object, the set of references to data blocks, of the variable-group data object, including a reference to the particular data block on the hardware memory;
    determining, by the one or more hardware processors, whether the variable-group data object is referenced by at least one other view-group data object;
    in response to determining that the variable-group data object is referenced by at least one other view-group data object:
        generating, by the one or more hardware processors, a new variable-group data object, on the hardware memory, based on the variable-group data object;
        allocating, by the one or more hardware processors, a new data block, on the hardware memory, based on the particular data block;
        replacing, by the one or more hardware processors, a reference, in the new variable-group data object, to the particular data block with a reference to the new data block; and
        modifying, by the one or more hardware processors, the new data block based on the request.

6. The method of claim 5, wherein the generating the new variable-group data object based on the variable-group data object comprises copying the set of references to data blocks from the variable-group data object to the new variable-group data object.

7. The method of claim 5, wherein the allocating the new data block based on the particular data block comprises:
    allocating the new data block to have a data size at least equal to a data size of the particular data block; and
    copying data content of the particular data block to the new data block.

8. The method of claim 5, further comprising:
    in response to determining that the variable-group data object is not referenced by any other view-group data object, modifying, by the one or more hardware processors, the particular data block based on the request.

9. The method of claim 1, further comprising:
    receiving, by the one or more hardware processors, a request to modify a particular data block of the CoW column data object with respect to the CoW-DF data object, the set of references to data blocks, of the variable-group data object, including a reference to the particular data block on the memory;
    determining, by the one or more hardware processors, whether the variable-group data object is referenced by at least one other view-group data object;
    in response to determining that the variable-group data object is referenced by at least one other view-group data object, generating, by the one or more hardware processors, a new variable-group data object, on the memory, based on the variable-group data object;

allocating, by the one or more hardware processors, a new data block, on the memory, based on the particular data block;

replacing, by the one or more hardware processors, a reference, in the new variable-group data object, to the particular data block with a reference to the new data block; and modifying, by the one or more hardware processors, the new data block based on the request.

10. A non-transitory computer-readable medium comprising instructions that, when executed by one or more processors of a machine, cause the machine to perform operations comprising:

generating a row-indexer data object on a memory, the row-indexer data object describing a set of row indices associated with the row-indexer data object;

generating a variable-group data object on the memory, the variable-group data object comprising a set of references to data blocks;

generating a view-group data object on the memory, the view-group data object comprising a reference to the variable-group data object; and generating a copy-on-write (CoW) column data object on the memory, the CoW column data object comprising a reference to the row-indexer data object and a reference to the view-group data object;

generating a copy-on-write data frame (CoW-DF) data object that comprises a set of references to column data objects, which includes a reference to the CoW column data object, wherein the set of references are implemented by one or more of a list, a vector, and an array;

generating a CoW row data object that comprises a reference to the CoW-DF data object and that represents a value at a specific row and column of a data frame;

generating a CoW data frame value data object that comprises a reference to the CoW column data object and a row index value; and generating a canonical-shallow copy of the CoW data frame value data object that comprises a new CoW data frame value data object generated such that the new CoW data frame value data object comprises a copy of the row index of the CoW data frame value data object, and a reference to the CoW column data object.

11. A system comprising:

a memory;

one or more hardware processors;

a data ingestion module that causes the one or more hardware processors to receive and store data from an industrial Internet-of-Things (IIoT) device;

a copy-on-write (CoW) data object module that causes the one or more hardware processors to generate, on the memory, a copy-on-write data frame (CoW-DF) data object by:

generating row-indexer data object on the memory, the row-indexer data object describing a set of row indices associated with the row-indexer data object;

generating a variable-group data object on the memory, the variable-group data object comprising a set of references to data blocks;

generating a view-group data object on the memory, the view-group data object comprising a reference to the variable-group data object; and generating, by the one or more hardware processors, a copy-on-write (CoW) column data object on the memory, the CoW column data object comprising a reference to the row-indexer data object and a reference to the view-group data object; and generating the CoW-DF data object that comprises a set of references to column data objects, which includes a reference to the CoW column data object, wherein the set of references are implemented by one or more of a list, a vector, and an array;

generating a CoW row data object that comprises a reference to the CoW-DF data object and that represents a value at a specific row and column of a data frame;

generating a CoW data frame value data object that comprises a reference to the CoW column data object and a row index value; and generating a canonical-shallow copy of the CoW data frame value data object that comprises a new CoW data frame value data object generated such that the new CoW data frame value data object comprises a copy of the row index of the CoW data frame value data object, and a reference to the CoW column data object; and a data analysis module that causes the one or more hardware processors to copy at least a portion of the data from the IIoT device to the CoW column data object.

12. The system of claim 11, wherein the CoW data object module comprises a modification module to modify a column of the CoW-DF column data object by:

applying a modification to a corresponding column of the canonical-shallow copy, the data analysis module comprising a machine learning (ML) module that generates prediction data from a ML model by using the canonical-shallow copy as input data.

13. The system of claim 11, wherein the CoW data object module comprises a modification module to modify a column of the CoW-DF column data object by:

applying a modification to a corresponding column of the canonical-shallow copy, the data analysis module comprising a machine learning (ML) module that trains a ML model on the canonical-shallow copy.

* * * * *